United States Patent
Royan et al.

(10) Patent No.: US 9,022,744 B2
(45) Date of Patent: May 5, 2015

(54) TURBINE ENGINE BLADE

(75) Inventors: Renaud Gabriel Constant Royan, Sucy en Brie (FR); Renaud Martet, Palaiseau (FR); Jean-Michel Guimbard, Cely en Biere (FR)

(73) Assignee: SNECMA, Paris (FR)

( * ) Notice: Subject to any disclaimer, the term of this patent is extended or adjusted under 35 U.S.C. 154(b) by 410 days.

(21) Appl. No.: 13/528,312

(22) Filed: Jun. 20, 2012

(65) Prior Publication Data

US 2014/0105750 A1  Apr. 17, 2014

(30) Foreign Application Priority Data

Jul. 13, 2011  (FR) ...................................... 11 56449

(51) Int. Cl.
*F01D 5/14*  (2006.01)

(52) U.S. Cl.
CPC ............... *F01D 5/141* (2013.01); *F01D 5/148* (2013.01); *F01D 5/145* (2013.01); *F05D 2220/3213* (2013.01); *F05D 2240/301* (2013.01); *F05D 2250/71* (2013.01); *F05D 2250/314* (2013.01); *Y02T 50/673* (2013.01)

(58) Field of Classification Search
CPC ......... F01D 5/141; F01D 5/143; F01D 5/145; F01D 5/148; F05D 2240/301; F05D 2240/303; F05D 2240/304; F05D 2250/314; Y02T 50/673
USPC ................ 415/191, 192, 208.1, 208.2, 211.2; 416/223 R, 223 A, 243, DIG. 2, DIG. 5
See application file for complete search history.

(56) References Cited

U.S. PATENT DOCUMENTS

| 5,088,892 A | * | 2/1992 | Weingold et al. | .............. 415/193 |
| 2010/0260609 A1 | * | 10/2010 | Wood et al. | .............. 416/223 R |
| 2011/0150660 A1 | | 6/2011 | Micheli et al. | |

FOREIGN PATENT DOCUMENTS

| DE | 1 168 599 | | 4/1964 | |
| EP | 1 098 092 A2 | | 5/2001 | |
| EP | 1 508 669 A1 | | 2/2005 | |
| EP | 1 798 377 A2 | | 6/2007 | |
| EP | 2 133 573 A1 | | 12/2009 | |
| WO | WO-2009149970 A1 | * | 12/2009 | .............. F04D 29/32 |

OTHER PUBLICATIONS

French Preliminary Search Report issued on Feb. 3, 2012 in corresponding French Application No. 11 56449 filed on Jul. 13, 2011 (with an English Translation of Categories).

* cited by examiner

*Primary Examiner* — Edward Look
*Assistant Examiner* — Juan G Flores
(74) *Attorney, Agent, or Firm* — Oblon, McClelland, Maier & Neustadt, L.L.P.

(57) ABSTRACT

A turbine engine blade having a plurality of blade sections stacked along a radial axis between a root and a tip. Each section extends along a longitudinal axis between a leading edge and a trailing edge, and along a tangential axis between a pressure-side face and a suction-side face. Each section presents a camber line, a deviation defined for each section as the difference between an angle between the tangent to the camber line at the leading edge and the longitudinal axis, and an angle between the tangent to the camber line at the trailing edge and the longitudinal axis. The minimum deviation is at the root of the blade, and the maximum deviation is present at sections situated in the range 0.3H to 0.8H, where H is the height of the blade measured from its root to its tip.

6 Claims, 3 Drawing Sheets

TURBINE ENGINE BLADE

BACKGROUND OF THE INVENTION

The present invention relates to a turbine engine blade, and more particularly to a blade of a rotor wheel of a turbine engine.

The invention relates more particularly to a rotor wheel of a low-pressure gas turbine of the type used in an aviation turbojet.

Conventionally, a turbojet has a plurality of nozzle stages, e.g. four stages. Each stage comprises a stationary nozzle forming a stator, and a rotor wheel, the nozzle and the wheel each having a plurality of vanes or blades organized radially relative to the longitudinal axis of the turbojet, which is the axis of rotation of the wheel.

Below, it is assumed that the axial direction X is the direction of the axis of rotation of the wheel on which the blade is to be mounted, that the radial direction Z is the height direction of the blade between its root and its tip, and that the tangential direction Y is the direction perpendicular to the axial and radial directions.

The invention applies more particularly to the rotor wheels of the first and second stages of a four-stage turbojet.

The blades of a turbine engine are subjected to high speeds of rotation. The main stream that provides propulsion is disturbed by secondary phenomena, in particular due to turbulence generated by passage vortices and by corner vortices. These vortices are present on the suction side of a blade, respectively in the main portion and in the region of its trailing edge. They originate from the stream of gas at the wall, of an intensity that depends on the pressure gradient between the pressure side and the suction side.

Such vortices give rise to sound nuisance and to vibration that it is desired to reduce. Furthermore, they give rise locally to pressure gradients that can reduce propulsive efficiency and constitute an additional source of mechanical fatigue.

Attempts have already been made to reduce those secondary phenomena, for example by fitting blades with special platforms at their roots and/or at their tips. Those solutions present a certain amount of effectiveness, but when they are employed, secondary phenomena continue to exist, even if they are reduced.

The applicant has directed its attention to the particular shape of the blade.

Its research has led it to find that the variation in the curve plotting deviation between the root and the tip of the blade can be optimized in such a manner as to reduce the above-mentioned secondary phenomena.

OBJECT AND SUMMARY OF THE INVENTION

Thus, a main object of the present invention is to limit the secondary phenomena that are generated on the suction side of a turbine engine blade, in particular a rotor wheel blade of the first or second stage of a turbojet, by optimizing the shape of the blade.

The invention provides a turbine engine blade comprising a plurality of blade sections stacked along a radial axis between a root and a tip, each blade section extending along a longitudinal axis between a leading edge and a trailing edge and along a tangential axis between a pressure-side face and a suction-side face, each section presenting a camber line formed by a midline between the pressure-side face and the suction-side face, a deviation being defined for each section as being the difference between an angle $\beta 1$ in between the tangent to the camber line at the leading edge and the longitudinal axis, and an angle $\beta 2$ between the tangent to the camber line at the trailing edge and the longitudinal axis, the blade presenting a height H measured from its root to its tip. By convention, the angles $\beta 1$ and $\beta 2$ are measured on the pressure side of the blade counterclockwise from the longitudinal axis towards the tangent to the camber line.

For the turbine engine blade of the invention, the above-mentioned object is achieved by the fact that the deviation is at a minimum at the root of the blade, presents a maximum value for sections of the blade situated between 0.3 H and 0.8 H, and decreases continuously from said maximum value to the tip of the blade, and by the fact that the value of the deviation at the tip of the blade is at least 5° greater than the value of the deviation at the root of the blade.

Thus, the solution proposed by the invention consists firstly in defining a blade profile for which the deviation is smaller at the root and at the tip of the blade than it is in a main portion of its height, lying in the range 30% to 80% of that height.

While conserving a mean deviation value that is comparable to the values of existing blades, the applicant has found that this specific shape serves to reduce the load on blades in the regions of their roots and of their tips.

As a result, the above-mentioned secondary vortex phenomena are decreased, in particular those that occur in the regions of the wall, of the root, and of the tip. Since loads are clearly reduced in those regions, the blade is also subjected to less mechanical fatigue than in the prior art.

Furthermore, the deviation value at the tip of the blade is at least 5° greater than the deviation value at the root of the blade.

This makes it possible to reduce very clearly the load on the blade at its roots, a region in which wall phenomena are the most significant, while obtaining the desired mean deviation, with deviation being a little greater at the tip than at the root.

The solution of the invention may be used on its own or in addition to other solutions for reducing secondary phenomena, e.g. the above-mentioned platforms.

Insofar as the blades are arranged radially in a rotor wheel, the distance (measured as an arcuate length) between two adjacent blades is greater at the tips of the blades than at their roots.

As a result, the secondary turbulence phenomena are in principle greater at the tips of blades than at the roots of blades. Starting from this observation, the person skilled in the art might have sought to curve the profile of the blade very little in the region of its tip.

On the contrary, the inventors have found that best results are obtained when the deviation is greater at the tip than at the root.

In a first advantageous variant that is particularly suitable for a rotor wheel blade of the second stage of a turbojet, the deviation presents the maximum value for blade sections lying in the range 0.3 H to 0.5 H.

The deviation maximum is thus located in a region situated in the range 30% to 50% of the height H of the blade. In particular, the deviation maximum may be observed in a region situated at about 40% of the height H of the blade.

In another advantageous variant that is particularly suitable for the rotor wheel of the first stage of a turbojet, the deviation presents the maximum value for blade sections lying in the range 0.6 H to 0.9 H.

Thus, the deviation maximum is situated in a region located in the range 60% to 90% of the height H of the blade. In particular, the maximum may be observed in a region situated at about 75% of the height H of the blade.

Advantageously, the deviation diminishes by at least 10° between a blade section situated at 0.9 H and the tip of the blade.

Whereas, on the other hand, the deviation maximum lies in the range 60% to 90% of the height H of the blade, this clear reduction makes it possible to bring the deviation at the tip of the blade to a small value, a value that is only slightly greater than the deviation observed at the root of the blade.

The invention also provides a turbine engine rotor wheel including a plurality of blades as defined above.

The invention also provides a turbine engine including at least one rotor wheel as defined above.

BRIEF DESCRIPTION OF THE DRAWINGS

The invention can be better understood and its advantages appear more clearly on reading the following detailed description of embodiments given as non-limiting examples. The description refers to the accompanying drawings, in which.

DETAILED DESCRIPTION OF THE INVENTION

Figure 1:
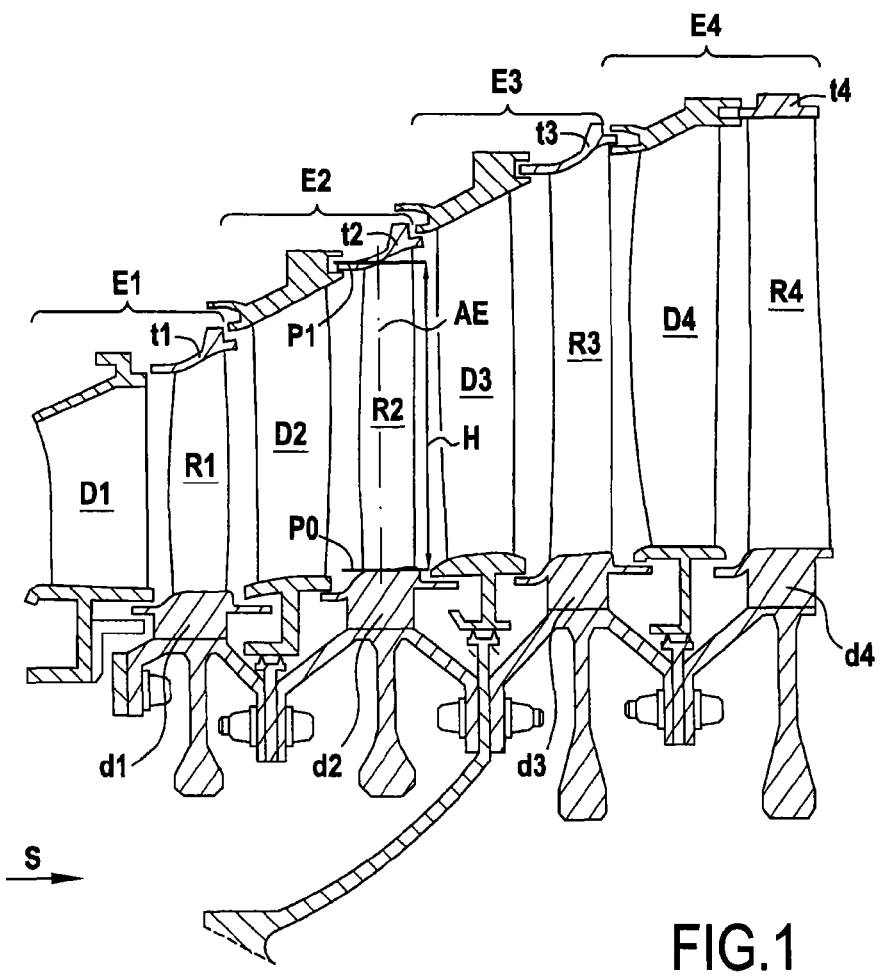
FIG. 1 is a fragmentary axial section view of a turbine having blades of the type of the invention.

The turbine shown in axial section in FIG. 1 has four stages referenced respectively E1 to E4. In the direction S going from upstream to downstream, each stage comprises a nozzle forming a stator portion of the turbine and having a plurality of radially-oriented vanes, and a rotor wheel forming a rotor portion of the turbine and comprising a plurality of radially-oriented blades.

In FIG. 1, the nozzle vanes of stages E1 to E4 are respectively referenced D1 to D4, and the blades of the rotor wheels of stages E1 to E4 are respectively referenced R1 to R4.

The nozzle vanes are fastened at both ends to stationary structure portions, while the blades of the rotor wheels are fastened to rotary disks, respectively referenced d1 to d4 via their roots, which are formed at their radially inner ends, closer to the axis of rotation A of the turbine. In the example shown, the tips of the rotor wheel blades, formed at their radially outer ends, carry outer platforms respectively referenced t1 to t4. The nozzle vanes D1 to D4 are connected at their roots and at their tips to stationary wall elements.

Figure 2:
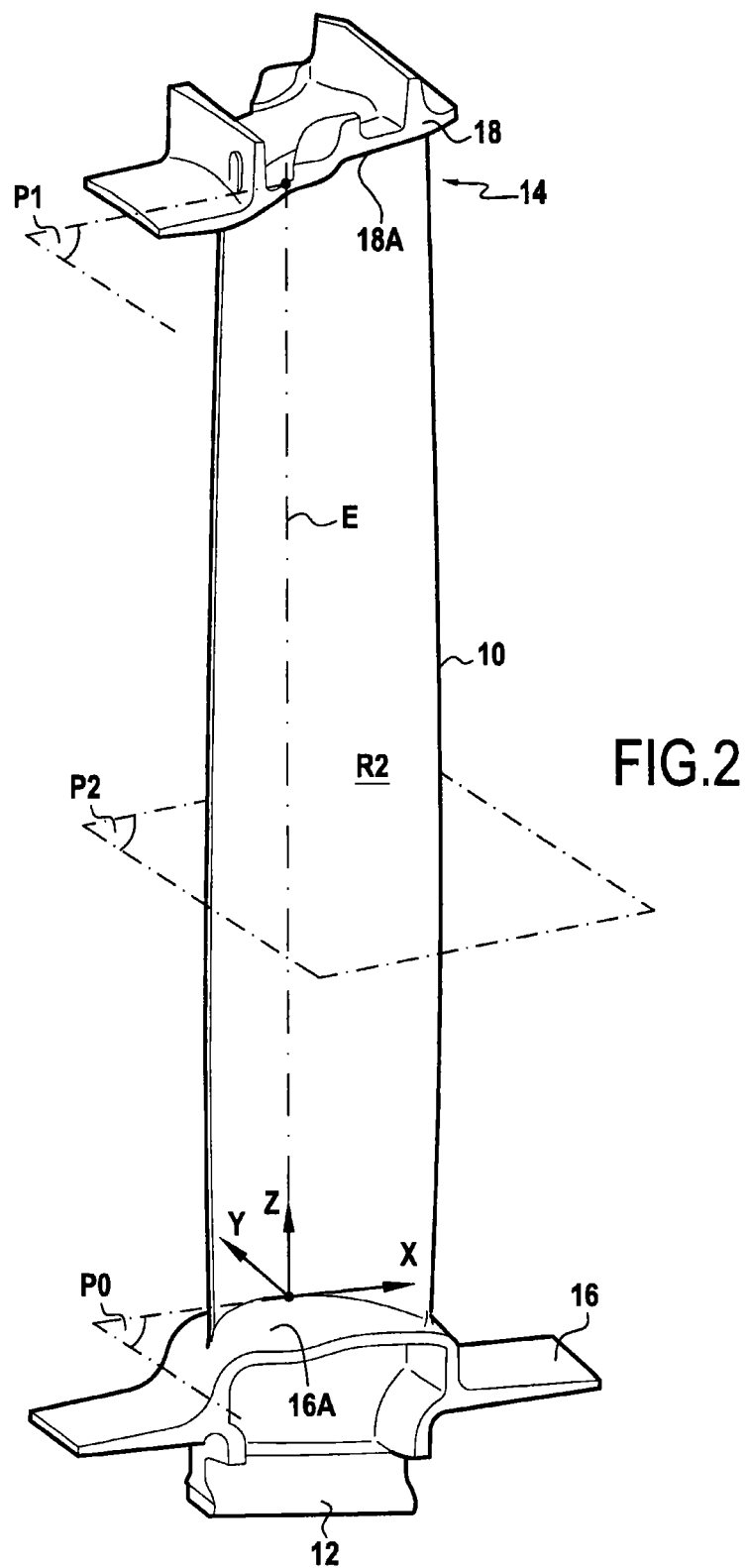
FIG. 2 is a perspective view of a blade of the invention.

By way of example, a blade R2 of the rotor wheel of the second stage is shown in perspective in FIG. 2. This blade R2 has a main blade portion 10 that extends in the direction of the radial axis Z-Z from a plane P0 situated beside the root 12 of the blade and a plane P1 situated beside the tip 14 of the blade.

The root 12 of the blade enables it to be connected to a support disk forming the hub of the rotor wheel, the main portion of the blade being fastened to said root via a connection platform 16. At its tip, formed at its outer radial end opposite from the platform 16, the blade is connected to an outer platform 18 that forms an outer shroud carried by the tips of the various blades making up the rotor wheel. A right-handed rectangular frame of reference X, Y, Z is marked in FIG. 2. The axis Z is the radial stacking axis of the blade. The axis X is the longitudinal axis, parallel to the axis of rotation A of the turbine as mentioned above with reference to FIG. 1. The axis Z is the radial axis, while the axis Y is the tangential axis.

The plane P0 is the intersection between the stacking axis E of the set of blades and the axially symmetrical flow passage at the hub. By convention, the stacking axis E of the set of blades, for the blade of a rotor wheel, is the axis that extends in the radial direction Z passing through the center of gravity of the profile of the blade in section in the X-Y planes that follow one another radially.

The plane P0 is thus an X-Y plane located at the intersection between the stacking axis E and the mounting surface 16A of the platform 16. The plane P1 situated at the tip of the blade is at the intersection between the stacking axis E and the axially symmetrical flow passage at the casing. This plane is located at the intersection between the stacking axis E and the mounting surface 18A of the outer platform 18.

The blade shown in FIG. 2 thus comprises a plurality of blade sections stacked along the radial axis Z between its root and its tip. More precisely, these sections extend along the axis Z from the plane P0 to the plane P1.

Figure 3:
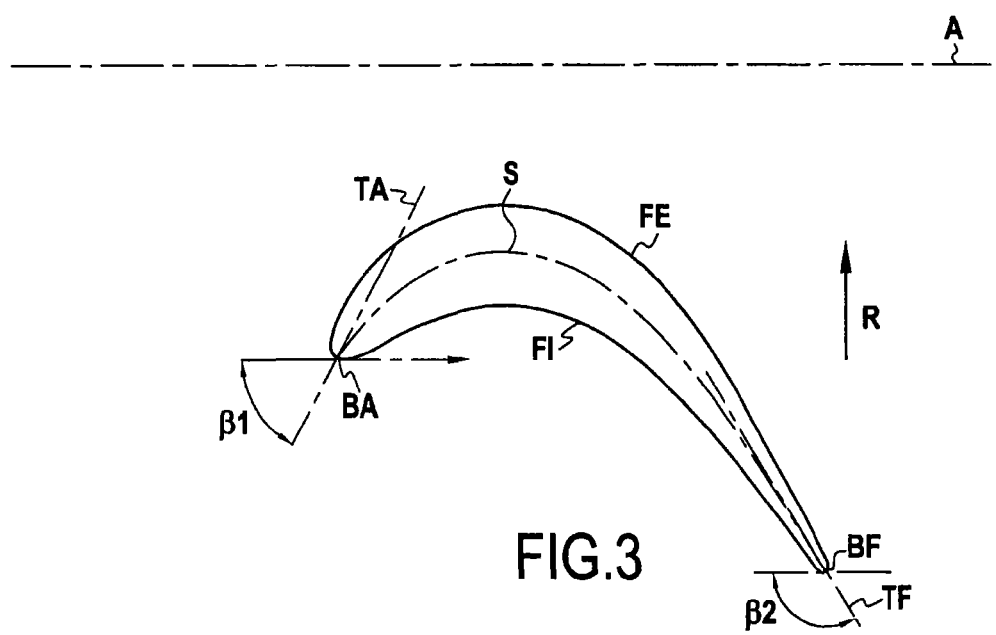
FIG. 3 is a diagrammatic representation of a section in an X-Y plane of the FIG. 2 blade.

FIG. 3 is a section in a plane P2 parallel to the X-Y plane. In this section, the leading edge of the blade and its trailing edge are referenced BA and BF. Its pressure-side face and its suction-side face are referenced FI and FE, which faces are defined relative to the direction of rotation R of the rotor wheel. The camber line of the blade section shown in FIG. 3 is defined by the line S marked as a chain-dotted line constituting the midline between the pressure-side face FI and the suction-side face FE.

In FIG. 3, reference $\beta 1$ marks the blade inlet angle between the tangent TA to the camber line S at the leading edge BA of the blade and the longitudinal axis X-X, and reference $\beta 2$ designates the blade exit angle between the tangent TF to the camber line at the trailing edge BF and the longitudinal axis X-X. These angles $\beta 1$ and $\beta 2$ are measured beside the pressure-side face of the blade counterclockwise from the longitudinal axis X-X towards the tangent to the camber line, TA or TF, as the case may be.

Figure 4:
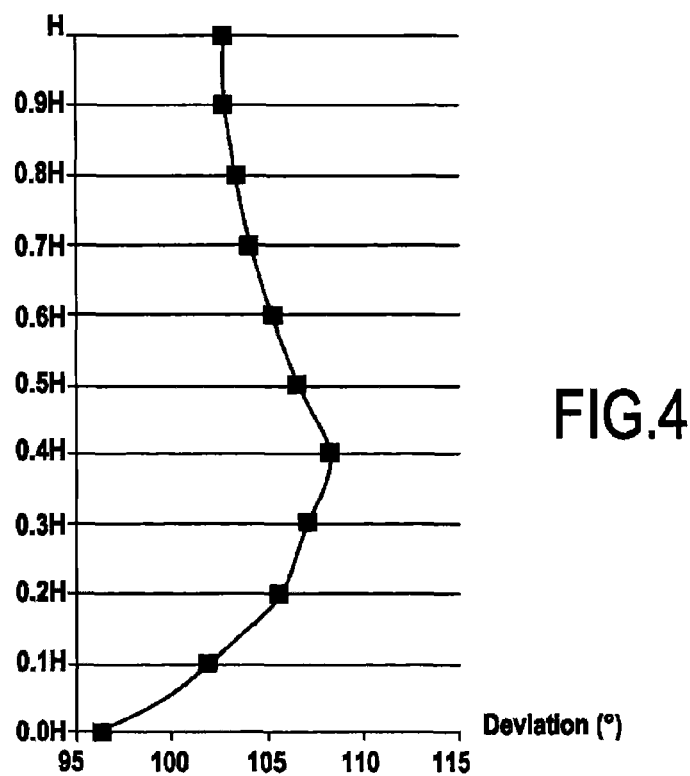
FIG. 4 is a curve showing the variation in the deviation of the FIG. 3 blade along the height of said blade, the blade constituting, in particular, a rotor wheel blade of the second stage of a turbojet.

There follows a description of FIG. 4 that shows how the deviation $\beta 2 - \beta 1$ between the planes P0 and P1 varies. The height H of the airfoil profile of the blade is plotted up the ordinate axis between a value 0 corresponding to the plane P0 and a value H corresponding to the plane P1. In the plane P0, i.e. the plane closest to the root of the blade, the deviation is slightly greater than 95°, being about 96.5°.

Starting from this plane P0, the deviation increases smoothly, initially quite strongly, and then less so to a maximum situated at 0.4 H. Overall, the deviation is at a maximum for those sections of the blade that lie in the range 0.3 H and 0.5 H. More precisely, in the example shown, the deviation angles at 0.1 H, 0.2 H, 0.3 H, and 0.4 H are respectively about 102°, 105°, 107°, and 108°. Beyond the maximum, the deviation decreases once more smoothly to the plane P1 defined at the height H. It decreases less and less strongly on approaching the plane P1. Thus, the deviation values at 0.5 H, 0.6 H, 0.7 H, 0.8 H, 0.9 H, and H are respectively about 106, 105, 104, 103.5, 103.2, and 103.

The value of the deviation angle at the tip of the blade is about 6.5% greater than its value at the root of the blade.

The above figures relate in particular to a rotor wheel of the second stage of the fan of a turbojet. For example, the height H may lie in the range 100 centimeters (cm) to 150 cm, and in particular is about 124 cm, and the plane P0 is at a distance lying in the range 280 cm to 370 cm, and preferably about 323 cm from the axis A of the turbine.

Figure 5:
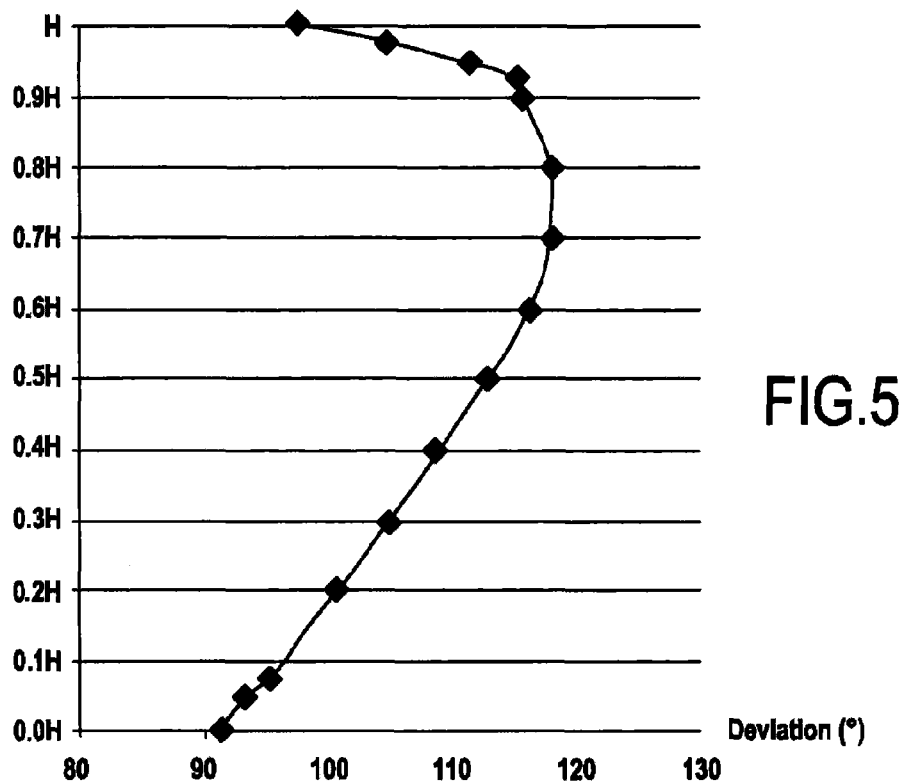
FIG. 5 is a curve analogous to that of FIG. 4, for a rotor wheel blade of the first stage of a turbojet.

FIG. 5 shows the deviation curve using the same conventions as in FIG. 4.

It can be seen that the deviation angle closest to the root of the blade, at 0 up the ordinate axis, is about 91°. Starting from the root of the blade, the deviation angle increases smoothly with a slope that is practically constant up to 0.6 H.

Over all of this portion, the deviation angle increases by about 4.5° for every 10% of the height H of the blade. It can be seen that the deviation is at a maximum for blade sections lying in the range 0.6 H to 0.9 H. More precisely, the deviation angles at 0.6 H and at 0.9 H are similar, being about 115°, whereas the angles at 0.7 H and 0.8 H are slightly greater and almost identical to each other, being about 107°. Between 0.9 H and H, the deviation varies strongly so as to return to an angle of about 97° for the blade section closest to the tip, as defined by the height H at the plane P1. Thus, the deviation diminishes by at least 10%, and in this example by about 15%, between 0.9 H and H.

FIG. 5 relates in particular to a rotor wheel of a first stage of the fan of a turbojet. For example, the height H lies in the range 70 cm to 110 cm, and in particular is about 90 cm, and the plane P0 is at a distance lying in the range 270 cm to 360 cm, e.g. about 315 cm, relative to the axis A of the turbine.

Naturally, the values for the curves in FIGS. 4 and 5 are given by way of example. For the above-mentioned rotor wheel blades, the deviation angles may vary by a few degrees, in particular by ±5°, while ensuring these curves retain the same general appearance, in particular with reference to the positions of the above-described maximums.

The invention claimed is:

1. A turbine engine blade comprising:
   a plurality of blade sections stacked along a radial axis between a root and a tip,
   each blade section extending along a longitudinal axis between a leading edge and a trailing edge and along a tangential axis between a pressure-side face and a suction-side face,
   each section presenting a camber line formed by a midline between the pressure-side face and the suction-side face,
   a deviation being defined for each section as being the difference between an angle $\beta_1$ between the tangent to the camber line at the leading edge and the longitudinal axis, and an angle $\beta_2$ between the tangent to the camber line at the trailing edge and the longitudinal axis, the angle $\beta_2$ being greater than the angle $\beta_1$,
   the blade presenting a height H measured from its root to its tip, and the angles $\beta_1$ and $\beta_2$ being measured on the pressure side of the blade counterclockwise from the longitudinal axis towards the tangent to the camber line,
   wherein the deviation is at a minimum at the root of the blade, presents a maximum value for sections of the blade situated between 0.3 H and 0.8 H, and decreases continuously from said maximum value to the tip of the blade, and
   wherein the value of the deviation at the tip of the blade is at least 5° greater than the value of the deviation at the root of the blade.

2. A turbine engine blade according to claim 1, wherein the deviation presents the maximum value for blade sections lying in the range 0.3 H to 0.5 H.

3. A turbine engine blade according to claim 1, wherein the deviation presents the maximum value for blade sections lying in the range 0.6 H to 0.9 H.

4. A turbine engine blade according to claim 3, wherein the deviation diminishes by at least 10° between a blade section situated at 0.9 H and the tip of the blade.

5. A turbine engine rotor wheel including a plurality of blades according to claim 1.

6. A turbine engine including at least one rotor wheel according to claim 5.

* * * * *